No. 658,346. Patented Sept. 25, 1900.
J. T. COMMOSS.
PROCESS OF ORNAMENTING SURFACES.
(Application filed Dec. 12, 1899.)
(No Model.) 2 Sheets—Sheet 1.

WITNESSES:
Geo. B Rowley.
W. A. Locke.

INVENTOR
Joseph T. Commoss
BY
Charles E. Foe
ATTORNEY

No. 658,346. Patented Sept. 25, 1900.
J. T. COMMOSS.
PROCESS OF ORNAMENTING SURFACES.
(Application filed Dec. 12, 1899.)
(No Model.) 2 Sheets—Sheet 2.
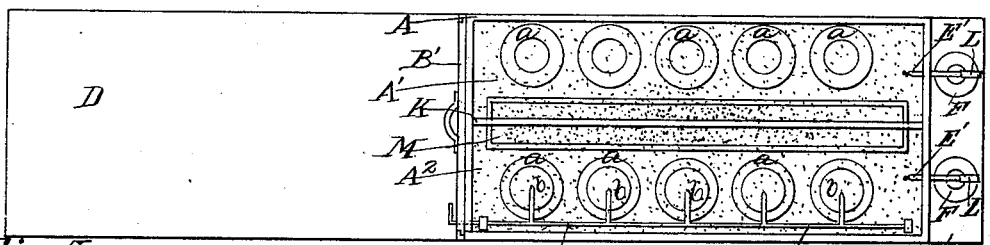
Fig. 5
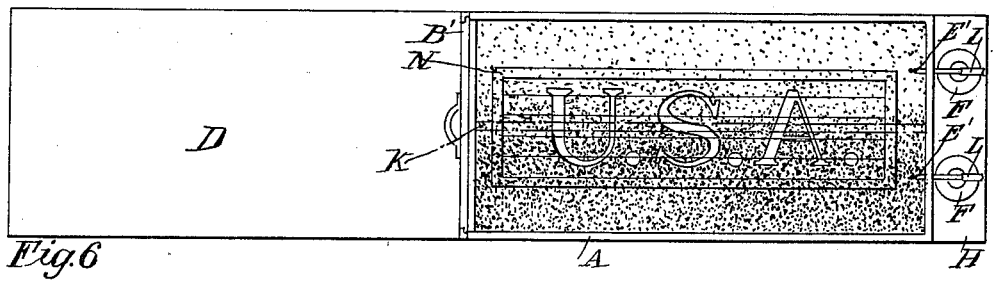
Fig. 6
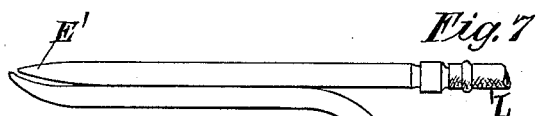
Fig. 7
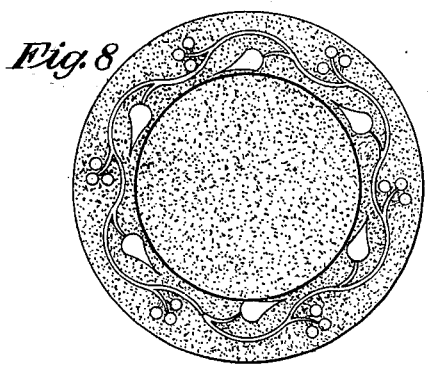
Fig. 8
Fig. 9
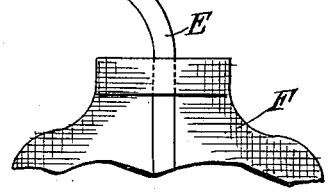
Fig. 10
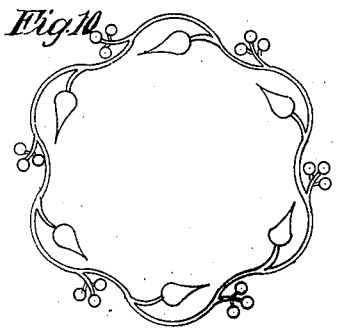
WITNESSES:
Geo. B Rowley
W. A. Locke.
INVENTOR
Joseph T. Commoss
BY
Charles B. Joe
ATTORNEY

UNITED STATES PATENT OFFICE.

JOSEPH T. COMMOSS, OF NEW YORK, N. Y., ASSIGNOR TO THE COMMOSS PROCESS COMPANY, OF SAME PLACE.

PROCESS OF ORNAMENTING SURFACES.

SPECIFICATION forming part of Letters Patent No. 658,346, dated September 25, 1900.

Application filed December 12, 1899. Serial No. 740,136. (No specimens.)

*To all whom it may concern:*

Be it known that I, JOSEPH T. COMMOSS, a citizen of the United States, and a resident of New York city, in the county of New York and State of New York, have invented a certain new and useful Process for Ornamenting Surfaces, of which the following is a specification.

The object of my invention is to provide a simple and rapid system of coating and ornamenting surfaces of woven fabrics, paper, wood, metal, glass, porcelain, and other material with dry, liquid, or liquefiable substances.

In practicing the invention the article to be coated or ornamented is placed in a closed chamber and the ornamenting substance, usually in a fluid state, is injected through an atomizer by a blast into the chamber, where it appears as a mist or cloud, and is there deposited by gravity on the articles exposed thereto.

By the new process signs may be painted and lettered, glass may be etched and colored, china may be decorated, and articles of various kinds ornamented. The articles receiving ornamentation may be at rest or in motion, according to circumstances. The colors and ornamenting substances used may be in the form of pigments, dry or liquid, and also include acids, varnishes, paints, dyes, inks, and vitrifiable colors.

To illustrate the new process, I have shown in the annexed drawings an apparatus wherein the invention is applied to use for decorating china and which is also applicable to other purposes.

Figure 1:
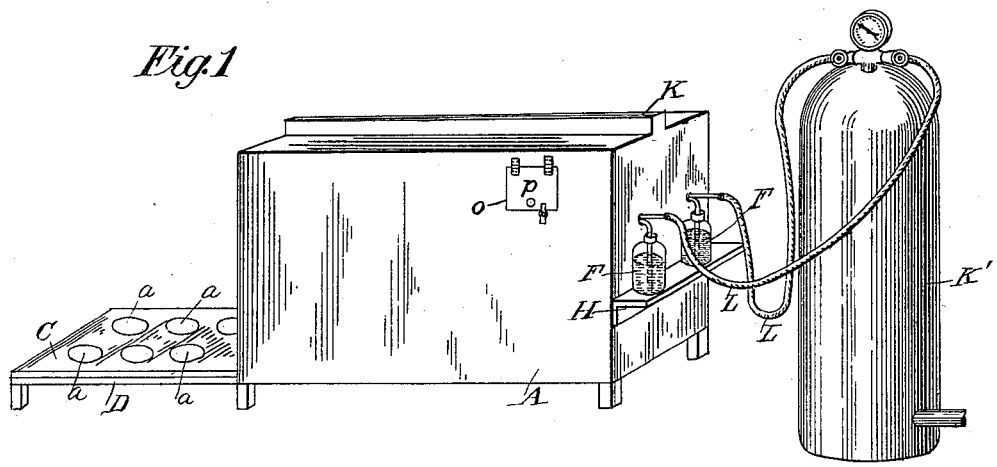
Figure 2:
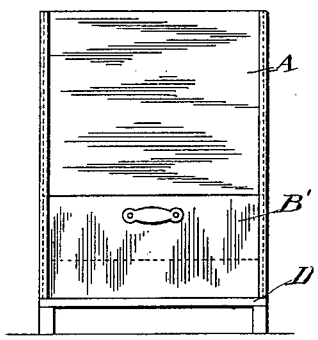
Figure 3:
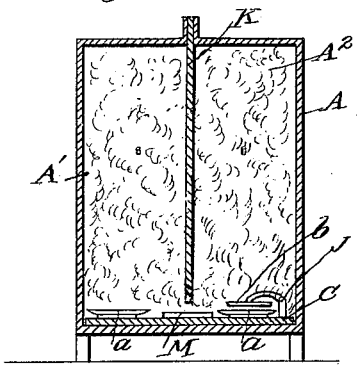
Figure 4:
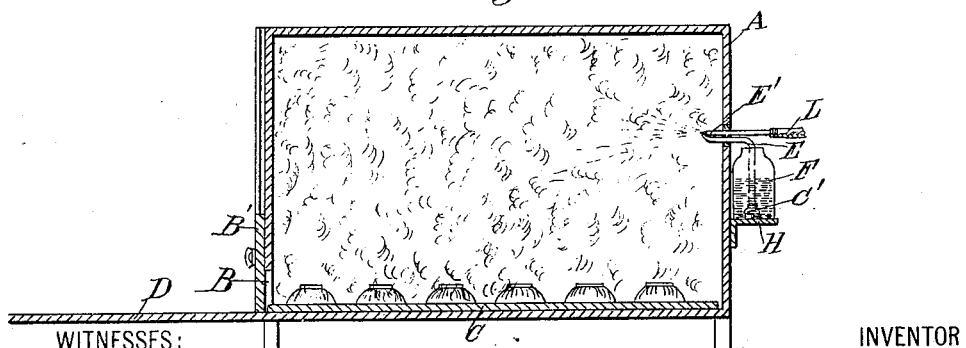

Figure 1 is a perspective view of the apparatus employed, showing the closed chamber and atomizer. Fig. 2 is an end view of the chamber. Fig. 3 is a cross-section of the chamber, taken through the center. Fig. 4 is a longitudinal section without the partition. Figs. 5 and 6 show an interior view as if seen from above, with the top removed, showing the work within. Fig. 7 shows the atomizer enlarged. Figs. 8 and 9 are illustrations of work done. Fig. 10 represents a pattern used in the operation.

A indicates a closed chamber of dimensions suitable to the work to be done, and is preferably oblong in shape and of a height exceeding the width. It is usually lined to facilitate cleaning the interior, and I find glazed paper is well adapted for such lining. At the end of the chamber, near the bottom, a narrow opening B is made and closed by a door B'. I provide a false bottom on tray C, to hold the article to be decorated, arranged to slide in and out through this opening, being supported when drawn out on a platform D.

For decorating china and porcelain vitrifiable colors are used, being prepared in a liquid state in the usual manner and of about the consistency of heavy copying-ink. The color is carefully strained into the receptacle, from which it is taken for use. The atomizer employed may be of any structure. Fig. 7 shows a form I have used with success. E indicates the receiving or suction tube which enters the liquid. E' is the usual discharge tube and nozzle for the colors and the blast. A fine strainer C' is applied to the immersed end of the receiving-tube. The receptacles for color F F, each furnished with its atomizer, are set on supports H, near the chamber. Apertures are formed in the ends of the chambers to receive the nozzles of the atomizers, which are inserted therein. Compressed air is preferably employed to supply the blast, and I find it advantageous to have the air stored in a receiver K', which communicates with the atomizers, as by flexible tubes L.

In operation, the articles having been arranged in the chamber by use of the tray C or otherwise, the blast is turned onto the atomizers and a fine spray of color is blown into the chamber, appearing therein as a mist or cloud. The color in this state of fine subdivision falls by gravitation and settles upon the articles in the chamber, producing a fine grounding on their surfaces of a paler or darker hue, according to the quantity of color sent in or the time of exposure thereto. A small opening O is made in the chamber for observation purposes and is closed by a door $p$. Different colors or different tints of the same color may be applied by dividing the chamber, as by a partition K, into two or more compartments A' A², each having its own atomizer. To insure equalization of the deposit in all parts of the chamber alike, I find it of advantage to place atomizers at opposite ends of the chamber or compartment, so disposed that the entering jets will not interfere.

A feature of my invention consists in producing blends of party-colors, particularly at the line of meeting of the colors. For this purpose the general principle lies in the use of party-coverings arranged so as not to contact with the articles being ornamented. Thus articles, such as signs or show-cards M N, may be placed in the chamber, with one portion in each of the compartments, so as to partake of the color therein. The partition K, dividing them, is not brought into contact with the articles, whereby a space is left over them, the partition forming a party-cover thereto, and such non-contact permits the differing colors from the adjoining compartments to mingle momentarily and to form a blend at the line of junction under the covering afforded by the edge of the partition. Decorative effects in a great variety are produced in a similar manner by the use of party-covers approximating the shape of the articles ornamented. For illustration, a number of plates $a\ a$ are first exposed in the chamber to a grounding of color. Before it is dry non-contact covers $b$, of circular or other form, are placed over the plates, serving to shield the center portion thereof. The ware is then exposed again in the chamber for deposit of another color or tint, which is received on the rims only of the plates, and a fine blend of the two colors will appear on the meeting line thereof, as shown in Fig. 9. The covers may be made with perforations and of any shape, pattern, or contour desired. To avoid taking out the work in the interval between the successive deposits of color in order to change the covers, they may be arranged for operation from the outside of the chamber while the process is going on. For example, in Figs. 3 and 5 said coverings are shown as affixed in a suitable manner to a stem or shaft J, extending through the end of the chamber to the outside, where it is provided with a crank by which it may be turned to raise the covers $b$.

Decorative designs are produced on china and other articles by applying open-work or other patterns (see Fig. 10) to the articles in close contact with the surfaces to be ornamented either before or after laying on a coating or grounding of one or more colors or tints. The article, with pattern thereon, as shown in Fig. 8, is then exposed in the chamber A to receive a deposit of color. It is then taken out and the pattern removed, after which the ware is subjected to the operation of "firing" in a kiln in the usual manner to fasten the colors permanently.

I claim as my invention—

1. The process of coating and ornamenting surfaces of woven fabrics, paper, wood, metal, glass, porcelain and other materials, by means of a coating or ornamenting substance in a finely-divided condition, consisting in exposing the articles in a closed chamber to the deposit on their surfaces of the coating substance projected into the chamber in the form of a mist or cloud by means of a blast, substantially as described.

2. In the process of ornamenting surfaces by deposition thereon of an ornamenting substance in a finely-divided state, the method of forming designs on woven fabrics, paper, wood, china, glass and other material, consisting in applying suitable patterns containing open-work and other designs to the articles, then exposing such articles in a closed chamber to a cloud of the ornamenting substance projected into the chamber by a blast, and deposited on such articles by gravitation, and finally removing the patterns.

JOSEPH T. COMMOSS.

Witnesses:
EARLE H. SMITH,
WALTER A. LOCKE.